UNITED STATES PATENT OFFICE.

FRIEDRICH STOLZ AND KARL STREITWOLF, OF HÖCHST-ON-THE-MAIN, GERMANY ASSIGNORS TO FARBWERKE VORM. MEISTER LUCIUS & BRÜNING, OF HÖCHST-ON-THE-MAIN, GERMANY, A CORPORATION OF GERMANY.

1-PARA-DIALKYLAMINOARYL-2.4-DIALKYL-3-OXYMETHYL-5-PYRAZOLONE.

936,380.  Specification of Letters Patent.  Patented Oct. 12, 1909.

No Drawing.   Application filed January 27, 1909. Serial No. 474,557.

*To all whom it may concern:*

Be it known that we, FRIEDRICH STOLZ, Ph. D., and KARL STREITWOLF, Ph. D., subjects of the Empire of Germany, residing at Höchst-on-the-Main, Germany, have invented certain new and useful Improvements in 1 - Para - Dialkylaminoaryl - 2.4 - Dialkyl - 3 - Oxymethyl-5-Pyrazolones, of which the following is a specification.

We have found hitherto unknown compounds which are valuable on account of their antipyretic efficiency and the constitution of which corresponds to the formula:

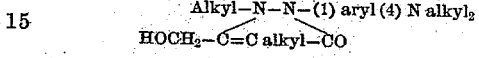

the corresponding rational term being 1-para-dialkylaminoaryl-2.4-dialkyl-3-oxymethyl-5-pyrazolones. These new compounds may be produced by treating with alkylizing agents the p-aminoaryl-2.4-dialkyl-3-oxymethyl-5-pyrazolones.

The process may, for instance, be carried out as follows: The 1-para-nitrophenyl-2.3.4-trimethyl-5-pyrazolone, crystallizing from benzene in the form of yellow leaflets and melting at 132°, is obtained by treating with dimethyl-sulfate the 1-p-nitrophenyl-3.4-dimethyl-pyrazolone, this being produced by condensing p-nitrophenylhydrazin with methylacetoacetic acid ester. By the additional action of one molecular proportion of bromin and afterward of alkali on the first named pyrazolone, the 1-para-nitrophenyl-2.4-dimethyl-3-bromomethyl-5-pyrazolone is obtained which separates from glacial acetic acid in yellow crystals melting at 213–214°. When the solution of the p-nitrophenyldimethylbromomethyl-pyrazolone in glacial acetic acid is boiled with alkali acetate the acetic acid ester of the 1-para-nitrophenyl-2.4-dimethyl-3-oxymethyl-5-pyrazolone is produced which forms yellow crystals melting at 163–164°. This acetate, when boiled with dilute sulfuric acid, is decomposed yielding para-nitrophenyl-2.4-dimethyl-3-oxymethyl-5-pyrazolone which forms yellow crystals melting at from 178–179°. After reducing this nitroalcohol by means of tin and hydrochloric acid and after elimination of the tin by sulfur hydrogen from the solution, the latter is concentrated and then by adding a larger quantity of sodium hydroxid the para-aminophenyl-2.4-dimethyl-3-oxymethyl-5-pyrazolone is precipitated in the form of a crystalline powder. This base crystallizes from hot water in the form of colorless prisms melting at 249°; it is difficultly soluble in most of the organic solvents. In an analogous manner homologous para-aminophenyl-2.4-dimethyl-3-oxymethyl-5-pyrazolones can be produced, and their conversion into the corresponding 4-dialkylamin derivatives may be carried out by means of methyl iodid, but other methylating agents may also be used.

Example: 5 parts by weight of 1-para-aminophenyl-2.4-dimethyl-3-oxymethyl-5-pyrazolone are heated with 3 parts of methyl iodid and 4 parts of methyl alcohol for 6 hours to 90–100°. Thereupon the alcohol is distilled off and the residue dissolved in water. From this solution, after being saturated with caustic soda, the 1-para-dimethylaminophenyl-2.4-dimethyl-3-oxymethyl-5-pyrazolone is isolated by extracting it by means of chloroform. The residue remaining after distilling off the chloroform yields the pure new base by crystallization from water and alcohol.

The 1-para-dimethylaminophenyl-2.4-dimethyl-3-oxymethyl-5-pyrazolone is a micro-crystalline white powder melting at 212–213°. It is readily soluble in alcohol and chloroform, but difficultly soluble in cold water, benzene and ethyl acetate. When treated with hydrochloric acid it forms a readily soluble hydrochlorid, the solution of which is of acid reaction and turns red when ferric chlorid is added.

Having now described our invention, what we claim is:

1. As new products, the 1-para-dialkyl-aminoaryl-2.4-dialkyl-3-oxymethyl-5-pyrazolones, which are white crystalline compounds, melting at temperatures above 150° without decomposing, being readily soluble in alcohol and chloroform, more difficultly soluble in cold water, forming when treated with hydrochloric acid hydrochlorids which are readily soluble in water and the solution of which is of acid reaction and turns red on adding ferric chlorid.

2. As a new product, the 1-para-dimethyl-aminophenyl-2.4-dimethyl-3-oxymethyl-5-pyrazolone, which is a white microcrystalline compound, melting at 212–213° without decomposing, being readily soluble in alcohol and chloroform, difficultly soluble in cold water, benzene and ethyl acetate, yielding, when treated with hydrochloric acid, a readily soluble hydrochlorid the solution of which is of acid reaction and turns red on adding ferric chlorid.

In testimony whereof, we affix our signatures in presence of two witnesses.

FRIEDRICH STOLZ.
KARL STREITWOLF.

Witnesses:
 JEAN GRUND,
 CARL GRUND.